Patented Apr. 8, 1924.

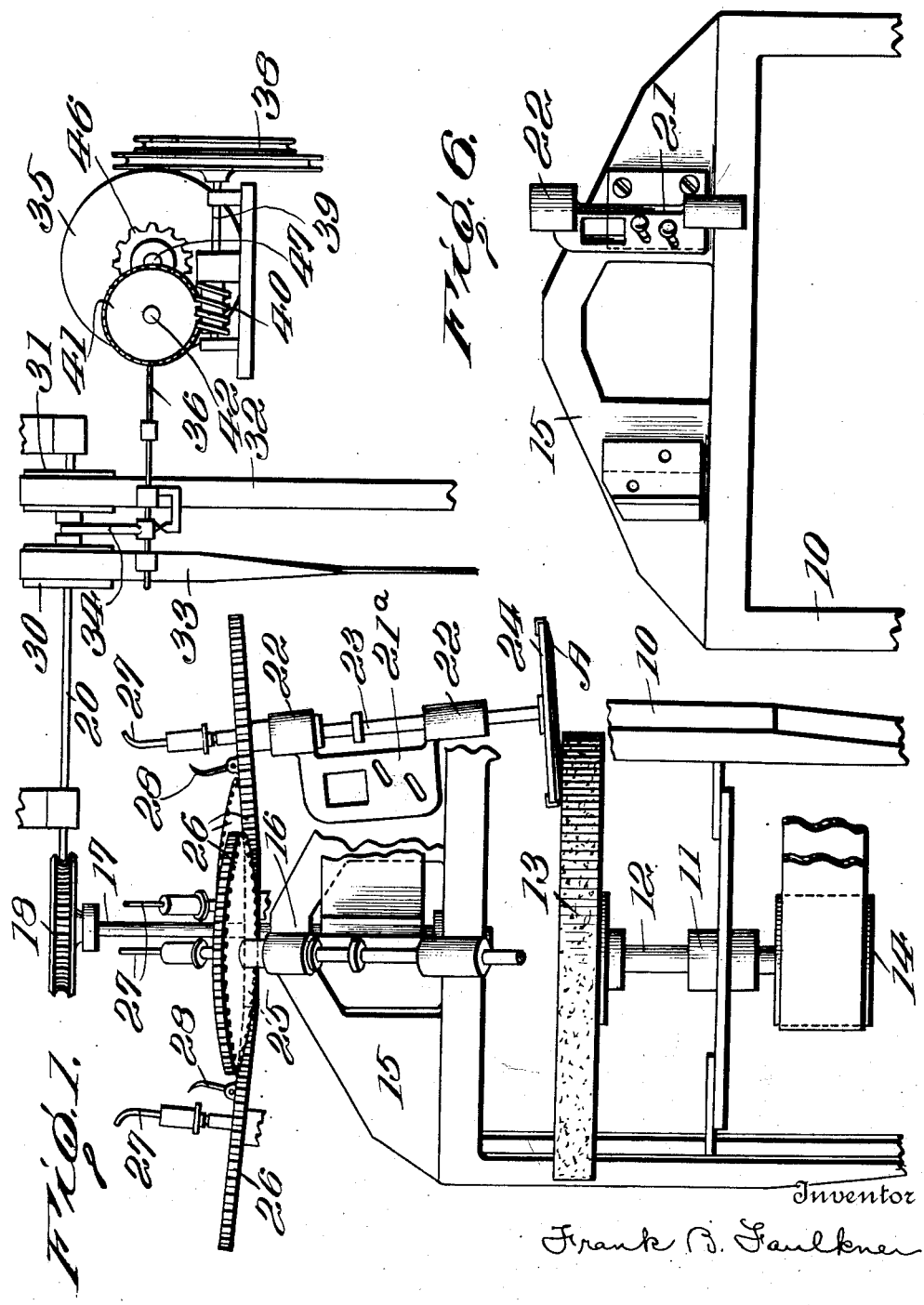

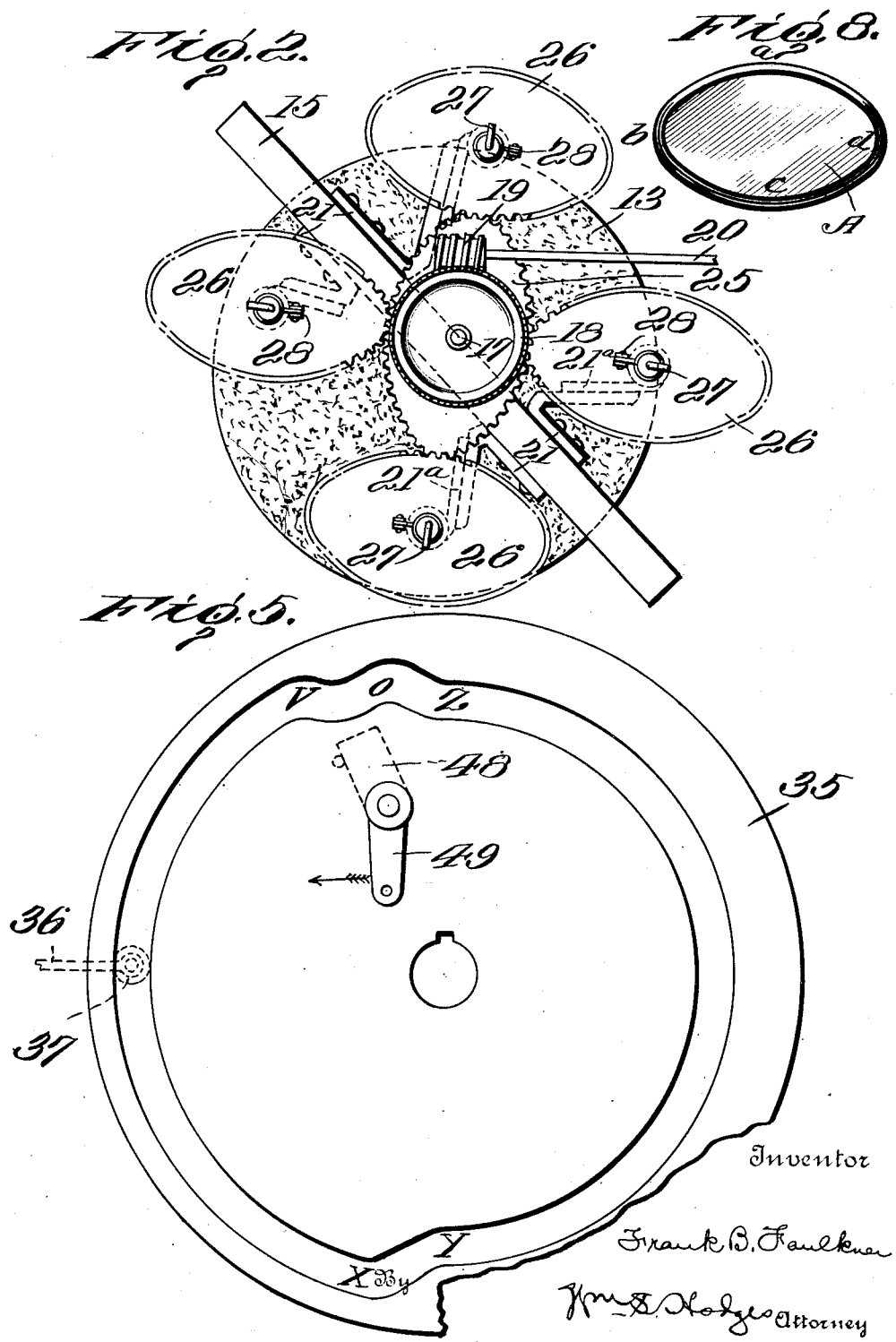

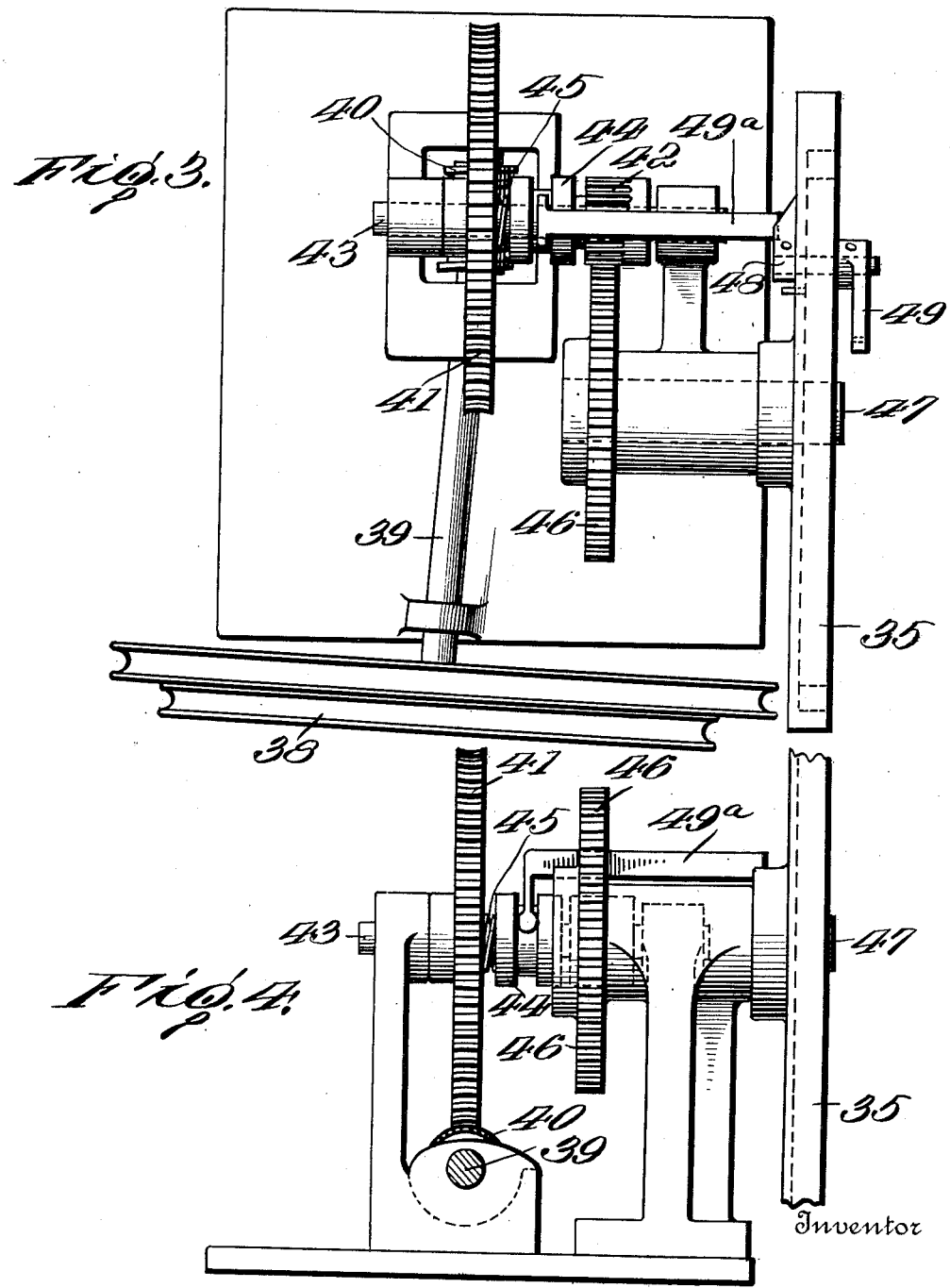

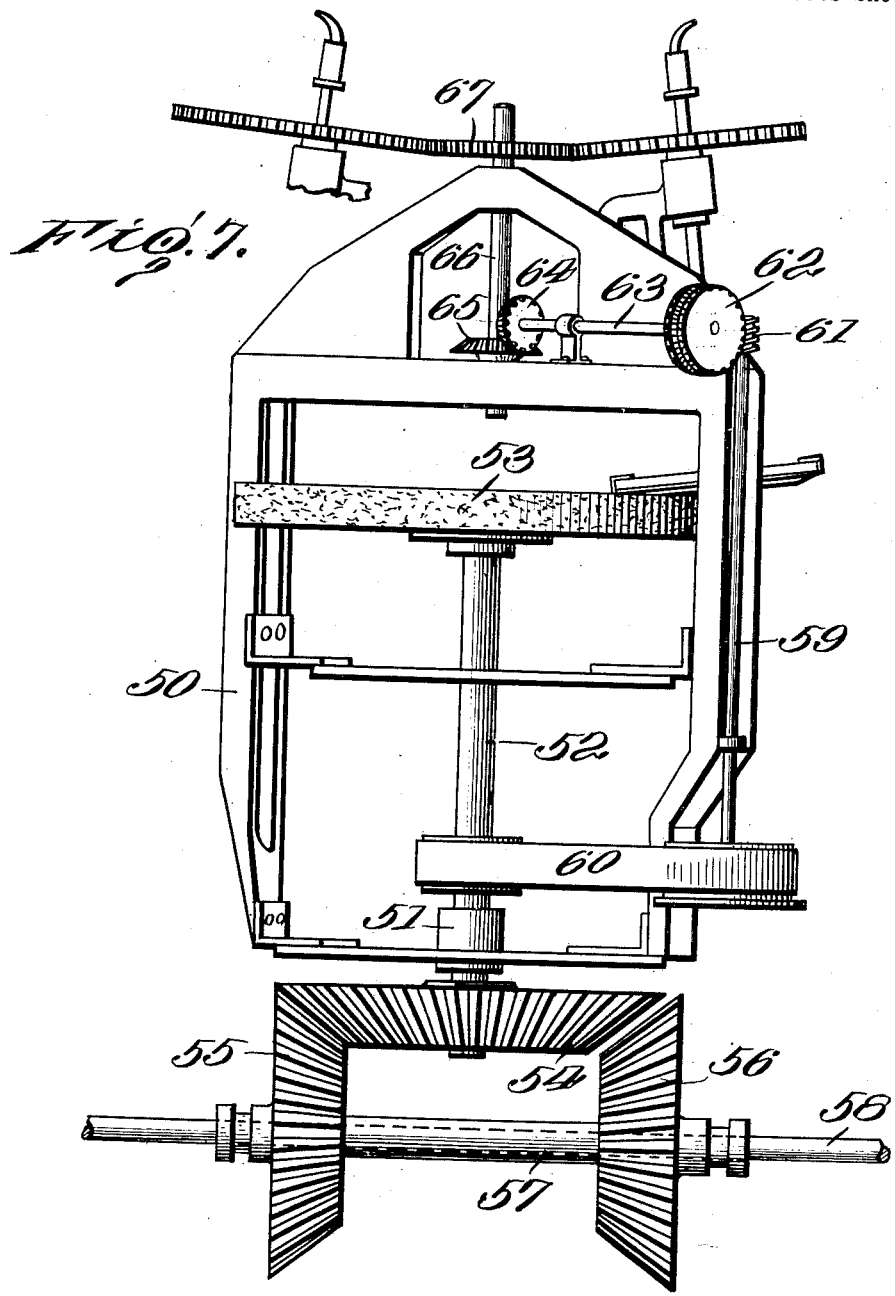

1,489,317

UNITED STATES PATENT OFFICE.

FRANK B. FAULKNER, OF MORGANTOWN, WEST VIRGINIA, ASSIGNOR TO THE STANDARD GLASS SPECIALTY COMPANY, OF MORGANTOWN, WEST VIRGINIA, A CORPORATION OF WEST VIRGINIA.

BEVEL-FORMING MACHINE.

Application filed July 30, 1920. Serial No. 400,112.

*To all whom it may concern:*

Be it known that I, FRANK B. FAULKNER, a citizen of the United States, residing at Morgantown, in the county of Monongalia and State of West Virginia, have invented a new and useful Bevel-Forming Machine, of which the following is a specification.

This invention is a machine for beveling the edges of flat bodies of oval shape.

Owing to the difficulty in maintaining uniform pressures upon the edges of oval shaped flat bodies, when rotated in contact with a grinding surface and at an inclination thereto, automatic machinery for beveling the edges of such bodies is not in general use. The common practice, in beveling such bodies, is for the operator to manually hold them against a traveling grinding surface, each body being held at approximately the proper inclination to produce the desired bevel. The accuracy of the bevel, under such circumstances, depends entirely upon the care taken by the operator and it is obvious that careless handling will result in imperfect work and consequent loss. One of the objects of the invention is to provide a machine capable of applying accurate bevels of uniform width, to the edges of oval shaped bodies of flat glass, whereby the personal equation is removed. A further object is to provide means for rotatably supporting the glass body during the bevel forming operation, and automatically controlled means for periodically reversing the rotation thereof, whereby inequalities which would otherwise result, owing to the peculiar shape of the body being acted upon, will be overcome.

The invention will be hereinafter fully set forth and particularly pointed out in the claims.

In the accompanying drawings:—

Figure 1 is a side elevation illustrating a machine constructed in accordance with the invention. Figure 2 is a top plan thereof. Figure 3 is a plan view illustrating the reverse control mechanism. Figure 4 is a side view thereof. Figure 5 is a detail view of the reverse control cam. Figure 6 is a detail view illustrating the method of mounting the bearing brackets. Figure 7 is a side view illustrating a modification of the bevel forming mechanism. Figure 8 is a diagrammatic view illustrating the method of applying the bevel to the edge of an oval-shaped body.

Referring to Figures 1 and 2 of the drawings, 10 designates a frame of any desired or preferred construction, provided with means for supporting a bearing 11, in which is rotatably mounted the shaft 12, of a grinding stone 13. Rotative movement is imparted to the grinding stone by suitable means, such as a pulley 14, receiving power from any preferred source.

Mounted upon the frame 10, is a support 15, provided with a centrally disposed bearing 16, in which is rotatably mounted a transmission shaft 17, provided at its outer end with a worm wheel 18, driven by a worm 19, secured to a drive shaft 20. Adjustably attached to the support 15 are brackets 21, each provided with bolts passed through inclined slots of an adjustable member 21ª, provided with bearings 22, for the arbors 23 of chucks 24. Each bearing member 21ª is so attached to the bracket 21, that the arbor 23 mounted therein, is held at an inclination to the shaft 17, so as to sustain the chuck above the grinding stone 13, and at an angle to the plane of the grinding surface. Secured to the shaft 17 is an elliptical gear 25, which meshes with correspondingly shaped pinions 26, one for each of the arbors 23, four being shown. It is preferred to make the gear 25 and the pinions 26 of the same size and contour, and with the same number of teeth. Each pinion 26 is provided with a hub having a splined connection with its chuck shaft 23, whereby the latter is free for longitudinal movement, without becoming disengaged from its pinion.

The glass body A may be engaged by the chuck in any suitable manner. The type illustrated in the drawings is a well-known form of suction chuck, the arbor 23 being hollow, and the exhaust hose being attached at 27. Latches 28 are provided for temporarily maintaining the arbors 23 in a raised position, whereby the chucks may be a sufficient distance away from the grinding surface 13, to readily permit the work to be engaged and disengaged.

In operation the work is attached to the chuck and is held against the grinding surface by gravity. The gear 25 is driven at a constant speed by means of the shaft 20, which runs in one direction for a suitable period of time, and then is automatically reversed to run in the opposite direction for a corresponding period. The reason for this will be apparent from an examination of Figure 8 and a comparison thereof with Figure 1. Assuming the work A to be rotating clockwise, in contact with the top surface of the grinding wheel 13, and that the observer is looking upwardly at the bottom of the body A, it will be noted that as the body A rotates from point $a$ to point $b$ Figure 8 (a quadrant), the work arbor rises in harmonic motion, due to the gradual increase in the distance from the axis of the chuck to the point of contact with the grinding surface. From point $b$ to point $c$ it falls in harmonic motion; from quadrant $c$ to $d$ it again rises; and from quadrant $d$ to $a$ it again falls. It is evident that the rotation from $a$ to $b$ and $c$ to $d$, gives greater pressure and hence grinds away more glass, than rotation from $b$ to $c$ and $d$ to $a$, because, as the work arbor 23 rises (neglecting inertia because the speed is slow), the friction between the arbor 23 and its bearings, and its quill connection with the pinion 26, is added to the constant weight of the parts, and vice versa as the arbor 23 comes down toward the grinding surface, the friction retards the motion somewhat. These inequalities are neutralized by rotating the body A, approximately a half revolution in one direction and a half revolution in the reverse direction, any number of reversals or oscillations necessary to produce the desired results being made.

The reverse rotation of the chuck may be accomplished in any desired manner. For purposes of illustration, the shaft 20 is shown as driven by two pulleys 30 and 31. The pulley 31 is driven by an open belt 32 and the pulley 30 is driven by a crossed belt 33. The direction of rotation of the shaft 20 is controlled by means of a suitable clutch 34, conventionally illustrated, actuated by means of a cam 35, through the medium of a cam-actuating rod 36, provided with a roller 37.

Rotative movement is imparted to the cam 35 in suitable manner. The means illustrated comprises a pulley 38, which receives its power from a suitable source (not shown), said pulley being mounted upon a drive shaft 39, provided with a worm 40 meshing with a gear 41, keyed to a driving shaft 43 which runs constantly. Loosely mounted upon the shaft 43 is a pinion 42, provided with a clutch face complemental with a corresponding face on a shifting clutch member 44, which is normally held in clutching engagement with the pinion 42, by means of a spring 45. The pinion 42 drives a gear 46, keyed to a shaft 47, with which the cam 35 rotates. Assuming the roller 36 to be at the point V Figure 5, and that the pulley 30 is driving the shaft 20, its driving connection will remain undisturbed during the period that said roller 36 passes from point V to the point X. As said roller travels from point X to point Y, however, the rod 36 is shifted and imparts a corresponding movement to clutch 34, so that the pulley 30 is unclutched and the pulley 31 engaged so as to drive the shaft 20 in the reverse direction. During the travel of the roller 37 from point Y to point Z the pulley 31 will drive the shaft 20, and as said roller moves between the point Z and zero the clutch rod 36 is shifted to bring clutch 34 to neutral, so that the shaft 20 stops. At the same time a wedge block 48 pivotally mounted on the cam, engages the plunger 49, controlling the clutch 44, and shifts the latter to the left, releasing the pinion 42, thereby arresting the cam 35 in the neutral position for the clutch 34. When the operator is ready to again start the machine, he shifts the lever 49 attached to block 48, in the direction of the arrow, removing the said block out of engagement with the plunger 49, so that the spring 45 may move the clutch 44 into engagement with the gear 42, whereupon a new cycle begins, the movement of the roller 37 from the zero point to the point V serving to clutch the pulley 30 to the shaft 20.

A slight modification of the method of driving the transmission shaft is illustrated in Figure 7. In this form of the invention, the frame 50 is provided with bearings 51, in which is rotatably mounted a shaft 52, which carries the grinding element 53. On the lower end of the shaft 52, is secured a driving member which may be of any desired nature. Said member, for purpose of illustration, is shown as a gear 54. which is positioned to be selectively meshed with pinions 55 and 56, connected by a suitable sleeve 57, and free to slide upon a drive shaft 58, to which they are feathered. The gears 55 and 56 may be shifted in any desired manner, they being so spaced that only one of them will engage the gear 54 at any time, the direction of rotation of said gear 54 depending upon which of the pinions 55 and 56, is in engagement therewith. Mounted in suitable bearings carried by the frame is a counter shaft 59, connected by a belt 60 with the shaft 52, and provided at its upper end with a worm 61, meshing with a gear 62, secured to a driving shaft 63, having a pinion 64, meshing with a gear 65 upon a transmission shaft 66. Keyed to the shaft 66 is a driving pinion 67, corresponding to the pinion 25 of Figures 1 and 2, the chuck and its adjuncts being the same as illustrated in the last mentioned figures.

Having thus explained the nature of the invention and described an operative manner of constructing and using the same, although without attempting to set forth all of the forms in which it may be made, or all of the forms of its use, what is claimed is:—

1. A machine for beveling the edges of oval shaped bodies comprising means providing a traveling grinding surface, means for rotatably supporting a body of oval shape in position to cause its circumferential edge to rest at an inclination upon the grinding surface, and means for imparting alternate forward and reverse partial rotations to said supporting means to smooth out inequalities in the bevel being formed, due to variations in pressure of the body against the grinding surface resulting from the rotating oval shape.

2. A machine for beveling the edges of oval shaped bodies comprising means providing a traveling grinding surface, a chuck capable of supporting a body of oval shape, means for supporting the chuck above and in angular relation to the plane of the grinding surface, whereby the circumferential edge of the body is held in contact with the grinding surface by gravity, and means for imparting alternate forward and reverse partial rotations to the chuck, whereby inequalities of grinding due to the rotating oval shape of said body are removed.

3. A machine for beveling the edges of oval shaped bodies comprising means providing a travelling grinding surface, a chuck supported at an angle with respect to the plane of said surface and having means for supporting a body of oval shape, whereby the circumferential edge of said body will be maintained in contact with said grinding surface in an inclined position, means for imparting a predetermined partial rotation to the chuck in one direction, and means for imparting a coextensive rotation to the chuck in the opposite direction.

4. A machine for beveling the edges of flat bodies of oval shape comprising a frame, a movable grinding member mounted in said frame, a bracket supported by said frame, a bearing member adjustably secured to said bracket, a chuck rotatably supported by said bearing member and having means whereby it may carry the body to be beveled, said chuck being so positioned as to normally present the edge of said body at an angle to the plane of the active surface of said grinding member, and means for imparting alternate forward and reverse partial rotations to said chuck to smooth out inequalities in the bevel due to variations in the pressure of the body against the grinding surface resulting from the rotating oval shape.

5. A machine for beveling the edges of flat bodies of oval shape comprising a frame, a movable grinding member mounted in said frame, a bracket supported by said frame, a gravity controlled chuck rotatably supported by said bracket in a normally fixed position and having means whereby it may carry the body to be beveled, said chuck being so positioned as to normally present the edge of said body at an angle to the plane of the active surface of said grinding member, means for imparting co-extensive alternate forward and reverse rotations to said chuck, and means whereby the chuck may be temporarily held in an inoperative position in opposition to the action of gravity.

6. A machine for beveling the edges of flat bodies of oval shape comprising a frame, a movable grinding member mounted in said frame, a bracket supported by said frame, a chuck rotatably supported by said bracket and having means whereby it may carry the body to be beveled, said chuck being so positioned as to normally present the circumferential edge of said body at an angle to the plane of the active surface of said grinding member, means for imparting alternate forward and reverse partial rotations to said chuck to smooth out inequalities in the bevel due to variations in the pressure of the body against the grinding surface resulting from the rotating oval shape, and a pivoted latch positioned to directly engage the chuck to hold it in an inoperative position.

7. A machine for beveling the edges of oval shaped bodies comprising a frame, means mounted therein providing a traveling grinding surface, a transmission shaft mounted in said frame, a chuck capable of supporting a body of oval shape in angular relation to the plane of the grinding surface with the circumferential edge of the body maintained in contact with said grinding surface, gearing connecting said chuck with said transmission shaft, and means for imparting alternate forward and reverse rotative movements to the transmission shaft, whereby inequalities of grinding due to the rotation of the oval shaped body are removed.

8. A machine for beveling the edges of oval shaped bodies comprising means providing a traveling grinding surface, a chuck capable of supporting a body of oval shape and so supported as to present the edge of the body at the desired angle to the plane of said grinding surface, means for imparting alternate forward and reverse rotations to said chuck, whereby inequalities of grinding due to the shape of said body are removed, and automatically controlled means for arresting movement of the chuck after a predetermined period of operation.

9. A machine for beveling the edges of oval shaped bodies comprising a frame, mean mounted therein providing a travelling grinding surface, a transmission shaft mounted in said frame, a chuck having means for supporting the body to be beveled, and so supported as to present the edge of said body at the desired angle to the plane of said grinding surface, gearing connecting said chuck with said transmission shaft, means for imparting alternate forward and reverse rotations to said transmission shaft, and automatically controlled means for arresting movement of the transmission shaft after a predetermined period of operation.

10. A machine for beveling the edges of oval shaped bodies comprising a frame, means mounted therein providing a travelling grinding surface, a transmission shaft mounted in said frame, a plurality of chucks each having means for supporting a body to be beveled and so supported as to present the edge of said body at the desired angle to the plane of said grinding surface, a gear upon said transmission shaft, pinons on said chucks meshing with said gear, and means for imparting alternate forward and reverse rotations to said transmission shaft.

11. A machine for beveling the edges of oval shaped bodies comprising a frame, means mounted therein providing a travelling grinding surface, a transmission shaft mounted in said frame, a plurality of chucks each having means for supporting a body to be beveled and so supported as to present the edge of said body at the desired angle to the plane of said grinding surface, a gear upon said transmission shaft, pinions on said chucks meshing with said gear, means for imparting alternate forward and reverse rotations to said transmission shaft, and automatically controlled means for arresting movement of the transmission shaft after a predetermined period of operation.

12. A machine of the character described comprising means providing a grinding surface, a chuck having means for supporting the work in a manner to bring it into contact with said grinding surface by gravity, a drive shaft operatively connected with said chuck, forward and reverse driving devices for said shaft, and automatically controlled means for alternately engaging said drive shaft with said driving devices.

13. A machine of the character described comprising means providing a grinding surface, a chuck having means for supporting the work in contact with said grinding surface, a drive shaft operatively connected with said chuck, forward and reverse driving devices for said shaft, automatically controlled means for alternately engaging said drive shaft with said driving devices, and means for periodically disengaging said shaft from both driving devices.

14. A machine of the character described comprising means providing a traveling grinding surface, a chuck capable of supporting a body of oval shape in angular relation to the plane of the grinding surface with the circumferential edge of the body maintained in contact with said grinding surface, a transmission shaft operatively connected with said chuck, forward and reverse driving devices for said shaft, a clutch member on said shaft, and automatic means for alternately engaging said clutch member with said driving devices, whereby inequalities of grinding due to the rotation of a body of oval shape are removed.

15. A machine of the character described comprising means providing a grinding surface, a chuck having means for supporting the work in contact with said grinding surface, a drive shaft operatively connected with said chuck, forward and reverse driving devices for said shaft, a clutch member on said shaft, and automatic means for alternately engaging said clutch member with said driving devices, said automatic means including means for periodically shifting said clutch member to a neutral position.

16. A machine for beveling the edges of oval shaped bodies comprising means providing a traveling grinding surface, a chuck capable of supporting a body of oval shape in angular relation to the plane of the grinding surface with the circumferential edge of the body maintained in contact with said grinding surface, a transmission shaft operatively connected with said chuck, forward and reverse driving devices for said shaft, a clutch on said shaft, a cam, means for actuating the cam, and means operated by the cam for shifting said clutch member alternately into engagement with the driving devices.

17. A machine of the character described comprising means providing a grinding surface, a chuck having means for supporting the work in contact with said grinding surface, a drive shaft operatively connected with said chuck, forward and reverse driving devices for said shaft, a clutch on said shaft, a cam, means for actuating the same, and means operated by said cam for shifting said clutch member alternately into engagement with said driving devices, said cam having means for bringing said clutch member to neutral position upon completion of each rotation of the cam.

18. A machine of the character described comprising means providing a grinding surface, a chuck having means for supporting the work in contact with said grinding surface, a drive shaft operatively connected with said chuck, forward and reverse driving devices for said shaft, a clutch on said shaft, a cam, means for actuating the same, means operated by said cam for shifting said clutch member alternately into engagement with said driving devices, and means for arresting movement of the cam at the completion of each rotation thereof.

19. A machine of the character described comprising means providing a grinding surface, a chuck having means for supporting the work in contact with said grinding surface, a drive shaft operatively connected with said chuck, forward and reverse driving devices for said shaft, a clutch on said shaft, a cam, means for actuating the same, means operated by said cam for shifting said clutch member alternately into engagement with said driving devices, a control device for the cam actuating mechanism, and means carried by the cam for actuating said control device at the completion of each of its rotations, whereby the cam is disconnected from its actuating mechanism.

20. A machine of the character described comprising means providing a grinding surface, a chuck having means for supporting the work in contact with said grinding surface, a drive shaft operatively connected with said chuck, forward and reverse driving devices for said shaft, a clutch on said shaft, a cam, means for actuating the same, means operated by said cam for shifting said clutch member alternately into engagement with said driving devices, a control device for the cam actuating mechanism, and means carried by the cam for actuating said control device at the completion of each of its rotations, whereby the cam is disconnected from its actuating mechanism, said cam having means for bringing said clutch member to neutral position upon completion of each rotation of the cam.

In testimony whereof I have hereunto set my hand.

FRANK B. FAULKNER.